United States Patent [19]

Kishimoto

[11] Patent Number: 5,777,617

[45] Date of Patent: Jul. 7, 1998

[54] OUTPUTTING INFORMATION RECEIVED FROM EXTERNAL APPARATUS, AT CONTROLLED OUTPUT SIZE

[75] Inventor: Shinya Kishimoto, Yokohama, Japan

[73] Assignee: Canon Kabushiki Kaisha, Tokyo, Japan

[21] Appl. No.: 285,757

[22] Filed: Aug. 3, 1994

Related U.S. Application Data

[63] Continuation of Ser. No. 680,091, Apr. 3, 1991, abandoned.

[30] Foreign Application Priority Data

Apr. 6, 1990 [JP] Japan .................................. 2-90430

[51] Int. Cl.$^6$ .................................................. G06F 3/00
[52] U.S. Cl. ................................................... 345/418
[58] Field of Search ............................ 395/100, 102, 395/115, 116, 139; 358/403; 345/418

[56] References Cited

U.S. PATENT DOCUMENTS

| | | | |
|---|---|---|---|
| Re. 32,143 | 5/1986 | Carbonato et al. | 112/454 |
| 3,991,868 | 11/1976 | Robinson et al. | 400/124.07 |
| 4,146,874 | 3/1979 | Ide et al. | 382/243 |
| 4,300,206 | 11/1981 | Belleson et al. | 395/117 |
| 4,657,395 | 4/1987 | Shiraishi et al. | 356/385 |
| 4,715,006 | 12/1987 | Nagata | 395/110 |
| 4,807,046 | 2/1989 | Nakatani | 358/451 |
| 4,843,405 | 6/1989 | Morikawa et al. | 358/296 X |
| 4,876,562 | 10/1989 | Suzuki et al. | 347/139 |
| 4,907,094 | 3/1990 | Mishima et al. | 358/437 |
| 4,920,902 | 5/1990 | Takenoya et al. | 112/103 |
| 4,928,252 | 5/1990 | Gabbe et al. | 395/102 |
| 4,928,253 | 5/1990 | Yamauchi et al. | 345/508 |
| 4,953,229 | 8/1990 | Abe et al. | 382/284 |
| 4,992,958 | 2/1991 | Kageyama et al. | 395/116 |
| 4,995,103 | 2/1991 | Tsukada et al. | 395/102 |
| 5,101,494 | 3/1992 | Bilski et al. | 395/704 |
| 5,200,958 | 4/1993 | Hamilton et al. | 395/183.21 |
| 5,361,329 | 11/1994 | Morita et al. | 395/102 |

FOREIGN PATENT DOCUMENTS

| | | |
|---|---|---|
| 51294 | 5/1982 | European Pat. Off. . |
| 310829 | 4/1989 | European Pat. Off. . |
| 354791 | 2/1990 | European Pat. Off. . |
| 360572 | 3/1990 | European Pat. Off. . |
| 3629462 | 3/1988 | Germany . |
| 2195858 | 4/1988 | United Kingdom . |

OTHER PUBLICATIONS

Abstract of "Copier Programmed with a Long Memory". Business Equipment Digest, vol. 24 No. 5 (May 1984), p. 19.

*Primary Examiner*—Anton Fetting
*Attorney, Agent, or Firm*—Fitzpatrick, Cella Harper & Scinto

[57] ABSTRACT

An output apparatus having a memory for storing data representative of a pattern to be outputted; an instructing unit for instructing output of the pattern corresponding to the data stored in the memory; a generator for generating a pattern of a designated size in response to an instruction from the instructing unit; a unit for outputting the pattern generated by the generator; and a memory controller for controlling to hold the data corresponding to the pattern and stored in the memory in accordance with an instruction from the instructing unit, when the pattern of a first size was outputted and thereafter the pattern of a second size greater than the first size is to be outputted.

14 Claims, 9 Drawing Sheets

It is the YOKOHAMA ART
MUSEUM that presents
a remarkably prefound
||||||||||||||||
&____&____&____&
&____&____&____&
&____&____&____&
&____&____&____&
&____&____&____&
&____&____&____&

FIG. 2B

It is the YOKOHAMA ART
MUSEUM that presents
a remarkably profound
atmosphere in EXPO'
YOKOHAMA.
Of course, it shall
rise to the sky as the
main cultural facility
in "PORT FUTURE 21"
even after the EXPO.

At this time, the
printer goes offline.
In such case, this

FIG. 3A

It is the YOKOHAMA ART
MUSEUM that presents
a remarkably profound
atmosphere in EXPO'
YOKOHAMA.
Of course, it shall
rise to the sky as the
main cultural facility
in "PORT FUTURE 21"
even after the EXPO.

At this time, the
printer goes offline.
In such case, this

FIG. 3B

It is the YOKOHAMA ART
MUSEUM that presents
a remarkably profound
atmosphere in EXPO'
YOKOHAMA.
Of course, it shall
rise to the sky as the
main cultural facility
in "PORT FUTURE 21"
even after the EXPO.

At this time, the
printer goes offline.
In such case, this

It is the YOKOHAMA ART
MUSEUM that presents
a remarkably profound
atmosphere in EXPO'
YOKOHAMA.
Of course, it shall
rise to the sky as the
main cultural facility
in "PORT FUTURE 21"
even after the EXPO.

FIG. 6C

It is the YOKOHAMA ART
MUSEUM that presents
a remarkably profound
atmosphere in EXPO'
YOKOHAMA.
Of course, it shall
rise to the sky as the
main cultural facility
in "PORT FUTURE 21"
even after the EXPO.

REDUCTION = 50 %

OUTPUTTING INFORMATION RECEIVED FROM EXTERNAL APPARATUS, AT CONTROLLED OUTPUT SIZE

This application is a continuation, of application Ser. No. 07/680,091, filed Apr. 3, 1991, now abandoned.

BACKGROUND OF THE INVENTION

1. Field of the Invention

The present invention relates to an output method and apparatus for forming a visual image on a recording medium in accordance with externally inputted print data.

2. Related Background Art

Page printers, typically laser beam printers using electrophotography techniques have made a rapid increase in their printer market share.

Printer markets are essentially requesting high integration. As semiconductor memory products decline in cost, high integration is also requested for these products. The ability to reproduce high quality and complexity in an output image has been requested long since. At present, page descriptive languages, typically Postscript, are now available.

It takes several minutes, to several tens of minutes for an ordinary page printer to output an image of more or less complexity, the required time depending upon the performance of the CPU.

On the side of print information output, i.e., on the side of a host computer, there arises therefore a problem if debugging operations are to be carried out (if application software or the like is to be developed).

Figure 2A:
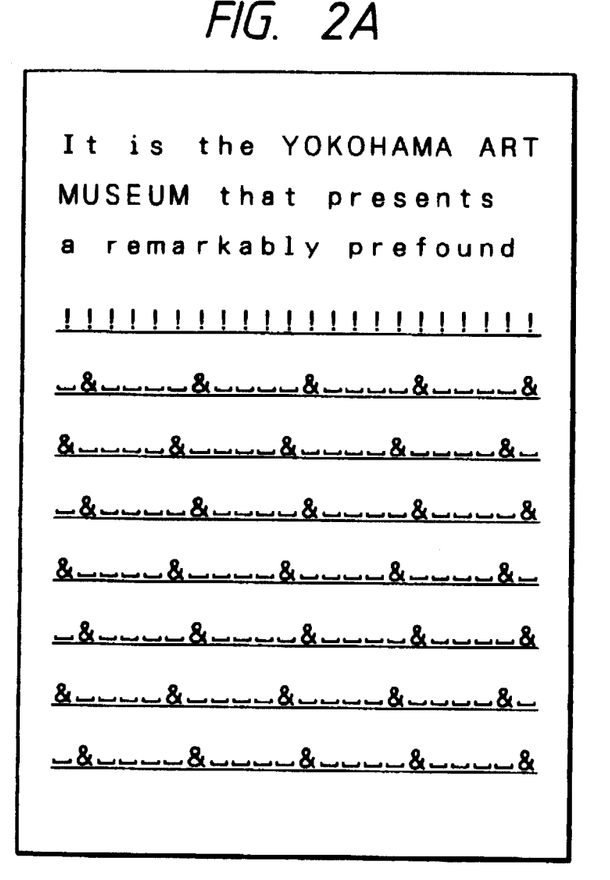
FIGS. 2A and 2B show an image printed during debugging operation, and an image originally intended to be outputted.
Figure 2B:
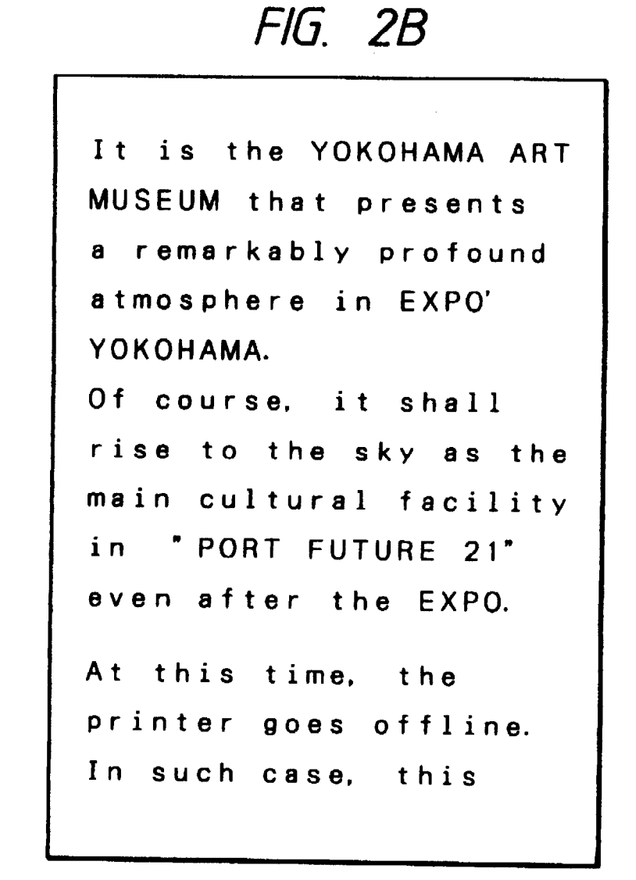

FIG. 2A shows an example of an image actually printed out, and FIG. 2B shows an example of an image intended to be outputted. In debugging operation, images are printed out several times in most cases to obtain the final image. Each time a test image is printed out, an unsatisfactory portion of the image is corrected and the program is modified correspondingly. The time required for such test printing until the final program is completed takes a considerable portion of the total time of the debugging operation. Not only in the case of debugging operations, but also in the normal printing operation, the time required for such test printing poses a problem.

Furthermore, the amount of recording supplies (such as toner and ink) consumed for test printing becomes large, resulting in a high cost for the debugging operation.

SUMMARY OF THE INVENTION

The present invention has been made in consideration of the above problems. It is an object of the present invention to provide an output method and apparatus capable of obtaining an output image in a short time for dealing with a request of a ready check of the printed results, and capable of reducing unnecessary consumption of recording supplies consumed.

In view of the above circumstances, the present invention aims at providing an output apparatus comprising means for storing a data representative of a pattern to be outputted; instructing means for instructing output of the pattern at a predetermined size or a size smaller than the predetermined size in accordance with the data stored in the storage means; means for generating the pattern at the size instructed by the instructing means; output means for outputting the pattern generated by the generating means; and storage control means for controlling to hold a data corresponding to the pattern and stored in the storage means in accordance with an instruction from the instructing means, when the pattern was outputted at the smaller size and thereafter the pattern is to be outputted at the predetermined size.

With the output apparatus constructed as above, if a pattern at a smaller size than the predetermined size is designated by the instructing means, the pattern is outputted at the smaller size. If the pattern is outputted at the smaller size and thereafter the same pattern is to be outputted, the data corresponding to the pattern and stored in the storage means is held.

DETAILED DESCRIPTION OF THE PREFERRED EMBODIMENTS

The prefer embodiments of this invention will be described in detail with reference to the accompanying drawings. The invention is not limited only to the following embodiments, but applicable to an apparatus constructed of a single apparatus unit and a system constructed of a plurality of apparatus units. The present invention is also applicable to an apparatus or system supplied with programs executing the concept of this invention.

Figure 1:
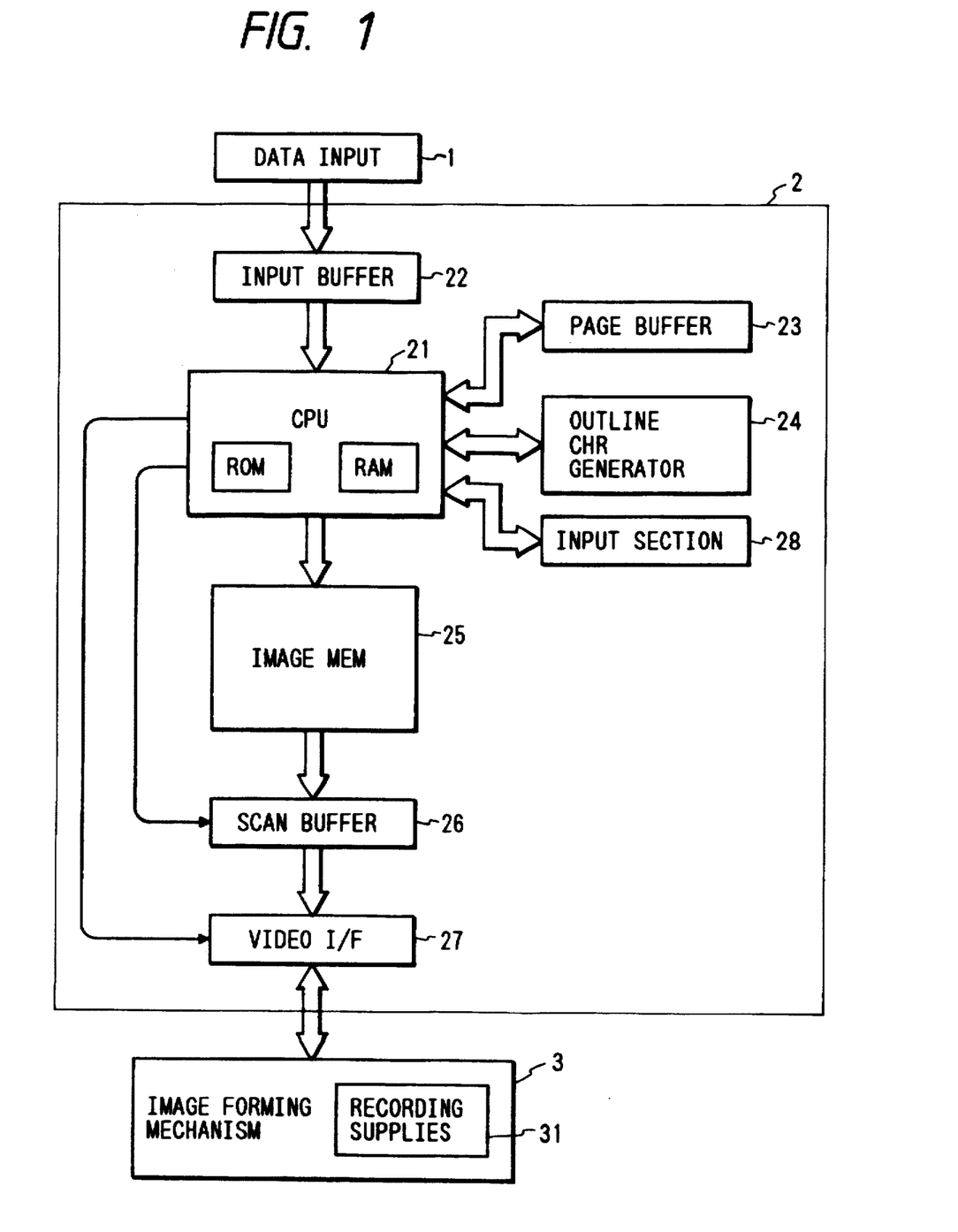
FIG. 1 is a block diagram showing the structure of a printing apparatus according to an embodiment of this invention.

FIG. 1 shows the structure of an image recording apparatus according to an embodiment of this invention.

In FIG. 1, a data input unit 1 (such as an input interface and the like) receives print data from a host computer (not shown) or the like. A data developer unit 2 analyzes inputted print data and generates image data recognizable by a user. An image forming unit 3 forms a visual image on a recording paper in accordance with generated image data.

Figure 4A:
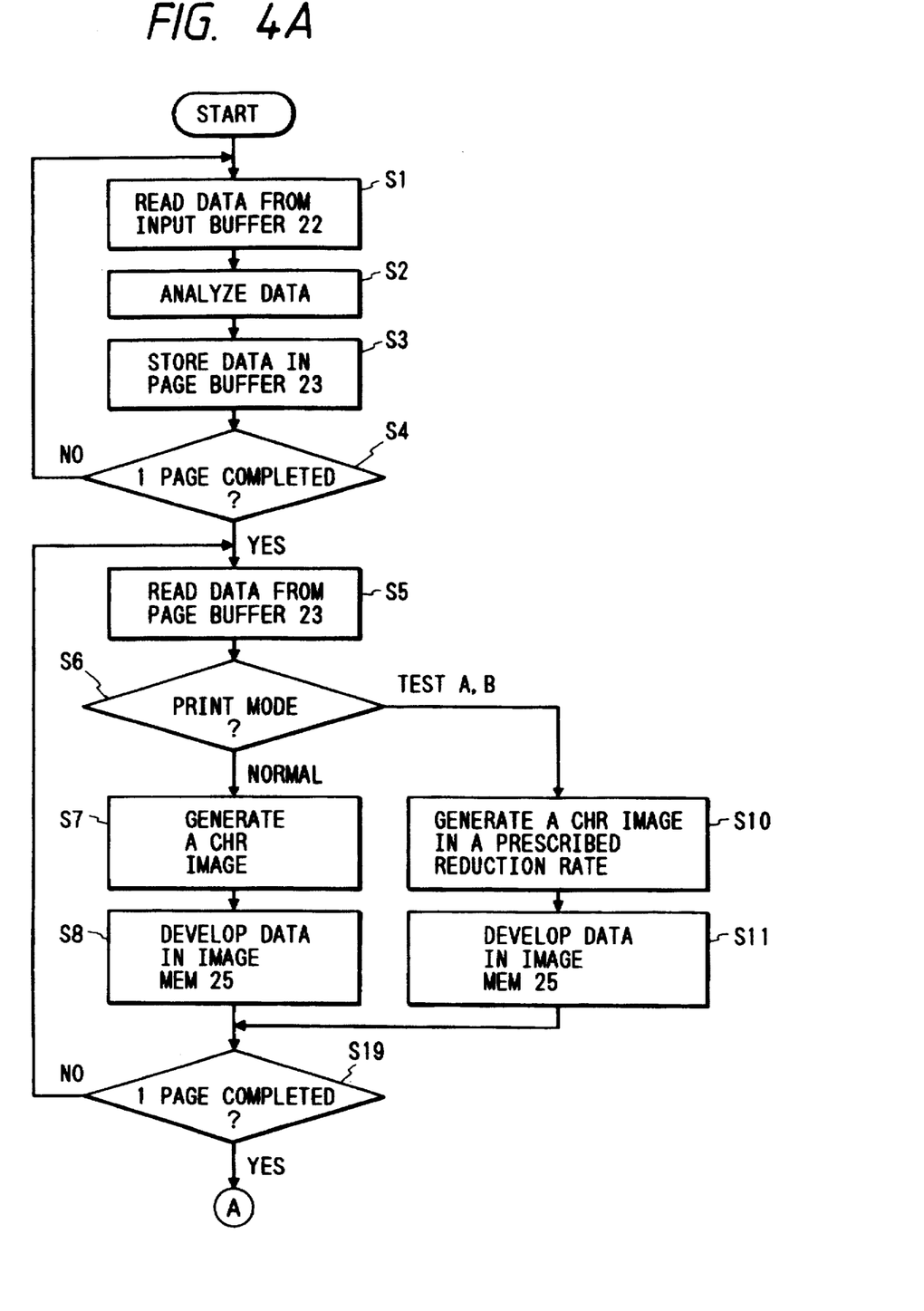
FIGS. 4A and 4B are a flow chart showing the control procedure of CPU 21 according to that embodiment.
Figure 4B:
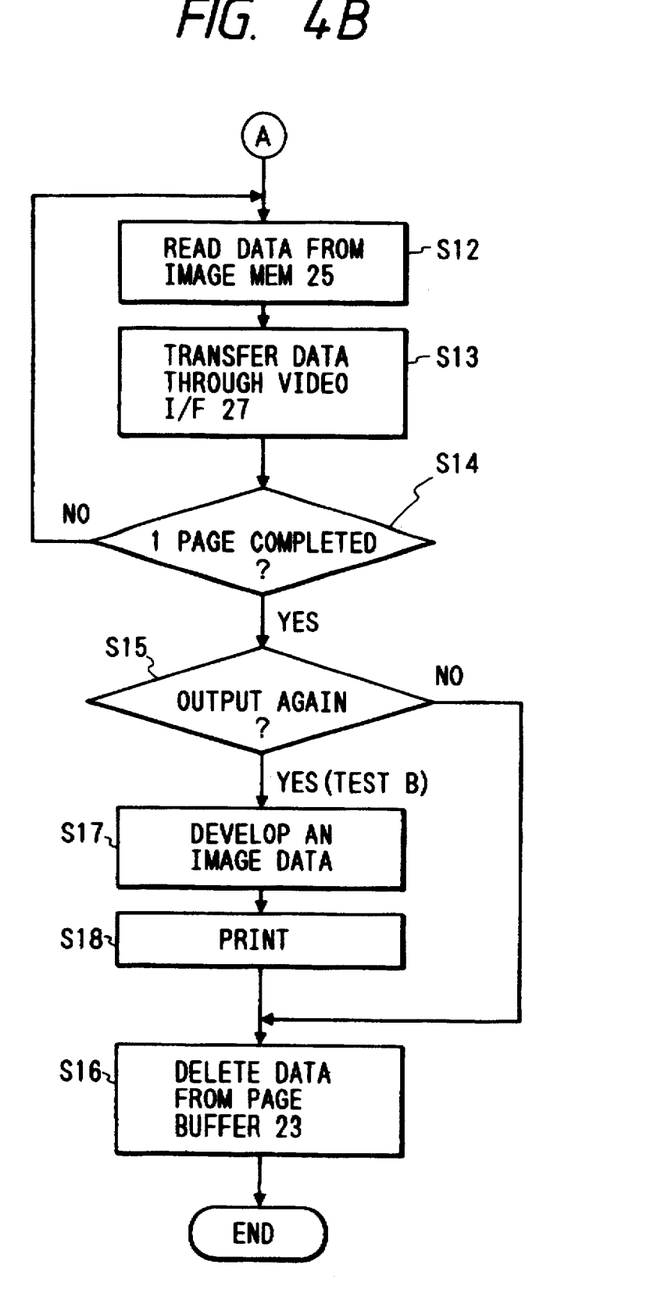

In the data developer unit 2, a CPU 21 controls the whole operation of this apparatus. CPU 21 includes a ROM storing the operation control procedure (described later with reference to FIG. 4) and a RAM used as a working area.

In the operation of CPU 21, data received from the data input unit 1 is temporarily stored in an input buffer 22. Thereafter, data stored in the input buffer 22 is sequentially picked out and analyzed to develop print data into a page buffer 23. The page buffer 23 stores print data for as many pages as it can store.

When print data of one page has been stored in the page buffer 23, CPU 21 sequentially picks up the print data, generates the corresponding image data, and starts developing it into an image memory 25. If the print data is a character code, the type and size of the character are communicated to an outline character generator 24, and CPU 21 receives the developed image of a suitable size. In the normal printing operation (in the normal printing mode to be described later), the size of a character requested by a print data in the page buffer 23 is the same size as that of the developed image generated by the outline character generator 24. The outline character generator 24 stores compressed font data representative of patterns of outline fonts, stroke fonts, run length fonts and the like. The outline fonts represent the outlines of characters by using coordinate data. The patterns are represented by unprocessed dot matrices. CPU 21 develops the image received from the outline character generator 24 into the image memory 25 at a predetermined area. Such development process is repeated until CPU 21 judges that the image of one page in the page buffer 23 has been fully developed.

When the image development process for the page now in concern has been completed, CPU 21 causes the developed print data in the page buffer 23 to be deleted so that at least the print data of the next page can be received. Thereafter, the image of one page in the image memory 25 is transferred via a video I/F 27 to the image forming unit 3. This image data transfer is carried out on a one scan image unit basis, and the image data is transferred by using a scan buffer 26 in response to a synch signal for the video I/F 27.

The image forming unit 3 is equipped with recording supplies 31, typically toner, ink, and the like. The image forming unit 3 records the image data received from the video I/F 27 on a recording paper by means of a known electrophotography technique or bubble jet technique.

An image is formed on a recording paper in the above-described manner in the normal printing operation. Images not intended by an engineer are often formed on the recording paper, however, when applications are being developed by the engineer. Such tendency is conspicuous particularly in the case of images requiring high quality and complexity.

FIG. 2A shows an example of an outputted image, and FIG. 2B shows the image intended to be formed. As described previously, the higher the quality and complexity required for an image, the longer the time required for debugging and the larger the consumption amount of recording supplies become.

In this embodiment, in order to solve the above problem, there are provided an normal printing mode and a test printing mode (having an A mode and a B mode).

The mode is selected by an operator from an input section 28.

For the operation where the print data of one page in the page buffer is sequentially picked up and developed into the image memory 25 as in the above-described normal printing operation, CPU 21 checks if the control is now in the test printing mode or not. If in the test printing mode, the image data is developed into the image memory 25 at a predetermined area at a predetermined reduction rate. If the print data is a character code, the size of the character identified by the print data and multiplied by the reduction rate is communicated to the outline character generator 24. CPU 21 develops the image data received from the outline character generator 24 into the image memory 25 at a predetermined area. Then, the reduced image of a page now of concern is developed into the image memory 25. After it is judged that all image data has been developed, the image data of one page is transferred via the video I/F 27 to the image forming unit 3, and an image is formed on a recording paper as described above.

Figure 3A:
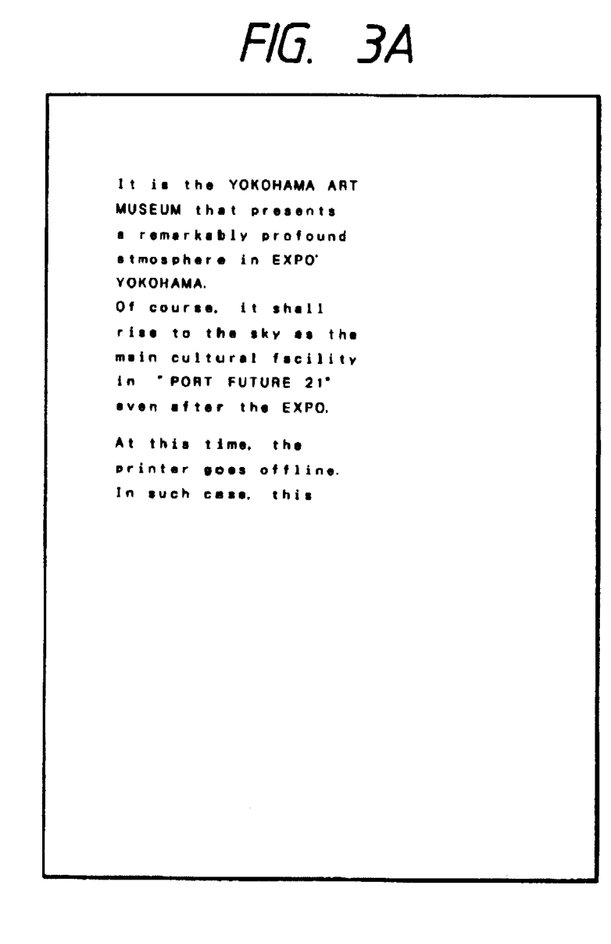
FIG. 3A shows an example of a print output in the test printing mode according to that embodiment.
Figure 3B:
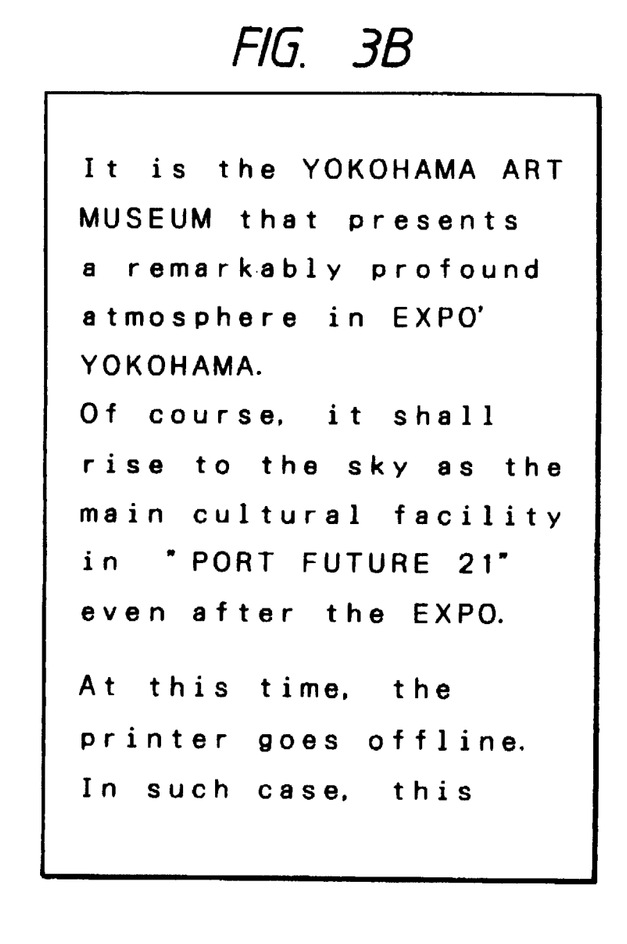
FIG. 3B shows an example of an image originally intended to be outputted.

FIG. 3A shows an image printed in the test printing mode, and FIG. 3B shows an image printed in the normal printing mode.

As seen from FIGS. 3A and 3B, the data amount of the image shown in FIG. 3A is small as compared with that of the image shown in FIG. 3B (one half in the horizontal and vertical directions). Therefore, the time required for generating and developing image data becomes short as compared with the normal printing mode. In the test printing mode, since the size of an image to be printed is small, recording supplies are consumed less.

In the normal printing mode, after the image data has been developed into the image memory 25, the developed print data in the page buffer 23 is deleted to provide an empty space for receiving the print data of at least the next page. The printing operation for the next page is executed in the similar manner as described above.

If the test printing mode is designated, the following operations are carried out in this embodiment.

If the test printing mode A is designated, after a reduced image is printed, the already printed print data in the page buffer 23 is deleted in preparation for printing the next page.

The test printing mode B is used when the reduced image is considered proper or when an operator wishes to check the actual size of the reduced image. Specifically, in the test printing mode B, after the reduced image is printed, an operator is allowed to print the reduced image at the actual size.

Therefore, if this mode B is selected, after the image data has been developed into the image memory 25, the print data corresponding to the image data in the page buffer 23 is not deleted. After the reduced image is printed and if a command to again print the image data is received from the input section 28, the image data at the actual size is developed into the image memory 25 in accordance with the corresponding print data in the page buffer 23, and printed on a recording paper. After the image data at the actual size of one page has been developed into the image memory 25, the print data corresponding to the printed image in the page buffer 23 is deleted.

CPU 21 processes data in accordance with the control procedure shown in FIGS. 4A and 4B which summarizes the above-described operation.

First, at step S1, data is read from the input buffer 22. The read-out data is analyzed (step S2). The resultant print data is stored in the page buffer 23 (step S3). If it is judged that print data of one page has been stored in the page buffer 23 (step S4), then the control advances to step S5 whereat the print data of one page in the page buffer 23 is read. At this time, the present printing mode is checked. This check is made by referring to the data discriminating a designated printing mode and being stored in the RAM at a predetermined address. If the printing mode is to be changed, the input section 28 is operated to enter a desired printing mode. The previous data is therefore renewed in accordance with the discrimination data indicating a new printing mode.

If it is judged to be the normal printing mode, at the loop composed of steps S7, S8, S9 and again step S5 the image data is developed into the image memory 25 in accordance with the generated print data.

If one of the test printing modes A and B is selected, at steps S10 and S11 the image data corresponding to the generated print data is developed into the image memory 25. In the loop composed of steps S5, S6, S10, S11, and S9 the image data is developed into the image memory 25 at a predetermined reduction rate.

After the image data of one page has been developed into the image memory 25 in any of the printing modes, the control advances to steps S12, S13, and S14. In these steps, the image data developed into the image memory 25 is sequentially read one line after another to output it via the video I/F 27 to the image forming unit 3.

In the above manner, an image of a normal size or a reduced size is printed. Thereafter, the control advances to step S15, where it is checked if a command to output again the image has been made or not. If not, or if in the normal printing mode or test printing mode A, the control advances to step S16. At step S16, the print data in the page buffer 23 having been developed into the image memory 25 is deleted to terminate a series of processes (to return to step S1).

If the test printing mode B is selected and it is judged that the command to again output the image is made, the control advances from step S15 to step S17. At step S17, in accordance with the print data stored in the page buffer 23, the image data of the normal size is developed into the image memory 25. Namely, the processes from step S5 to step S9 are repeated. Thereafter, the control advances to step S18 whereat the image data of the normal size developed into the image memory 25 is printed. The contents of step S18 are the same as steps S12 to S14 described above.

After the reduced image is printed as described previously, the same image is printed again at the normal size.

The control then advances to step S16, where the corresponding print data is deleted from the page buffer 23.

In the above embodiment, the predetermined constant reduction rate is used when the test printing mode is selected. The reduction rate may be set at an arbitrary value which an operator enters from the input section 28. With such an arrangement, the time required for printing an image may be shortened.

Figure 5:
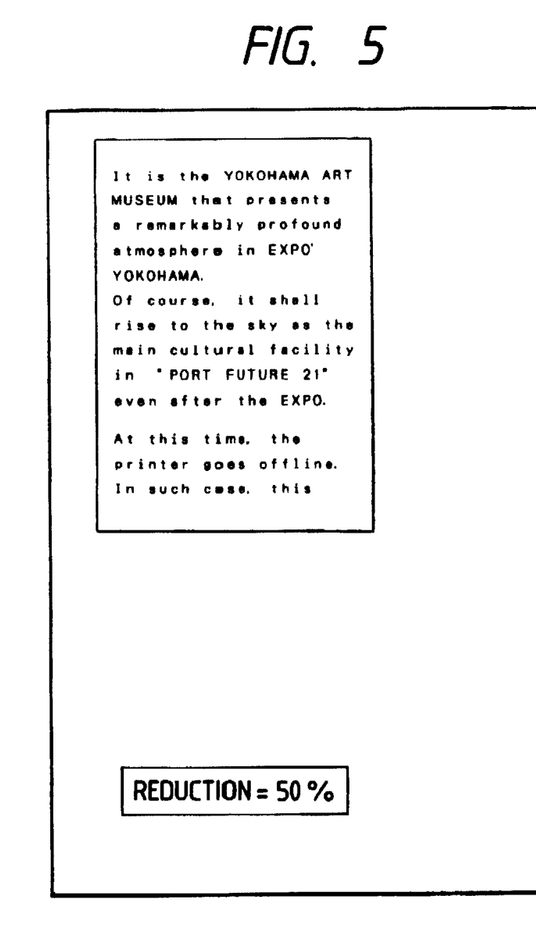
FIG. 5 shows an example of an image outputted in the test printing mode.

As shown in FIG. 5, an outer frame of a recording paper may be added. This outer frame may be printed by using a frame pattern generated by the outline character generator 24. The size of the outer frame is determined in accordance with the paper size, reduction rate, character size, margin position (top, right, bottom, and left), and the like. The detailed operation of determining the size is omitted. A reduction rate of an image may be printed below the outer frame.

Figure 6A:
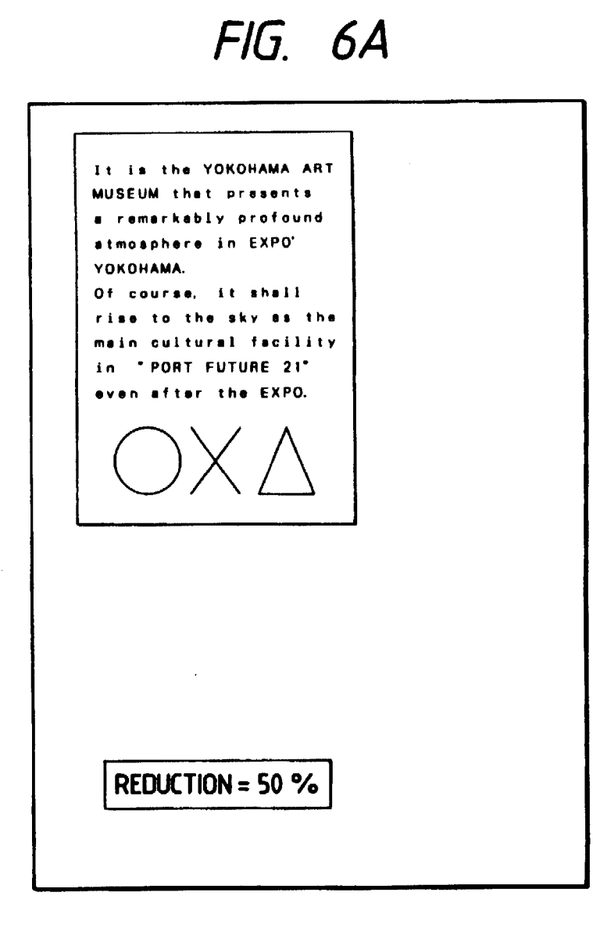
FIGS. 6A and 6C show images outputted in the test printing mode.
Figure 6B:
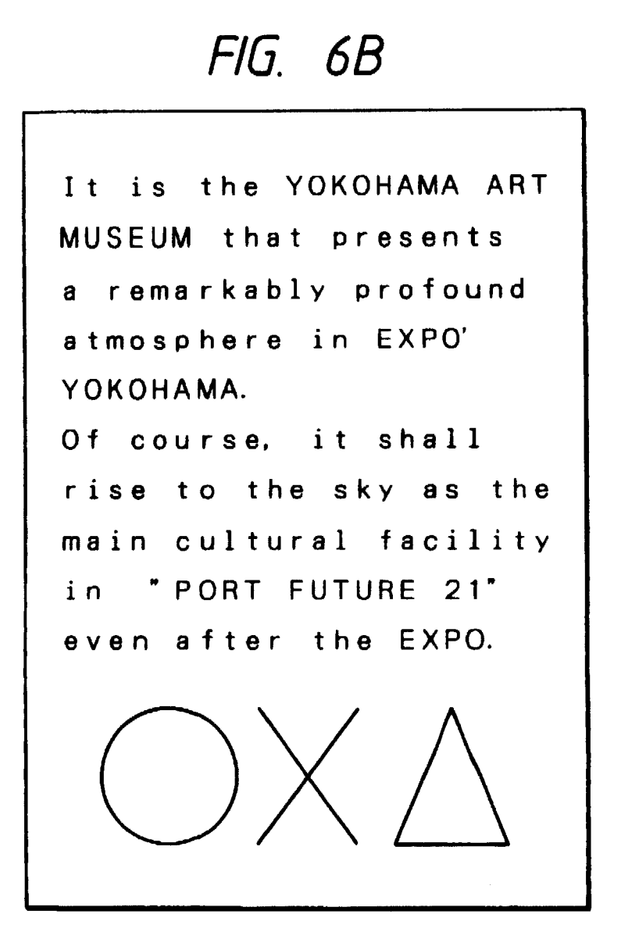
FIG. 6B shows an image originally intended to be outputted.
Figure 6C:
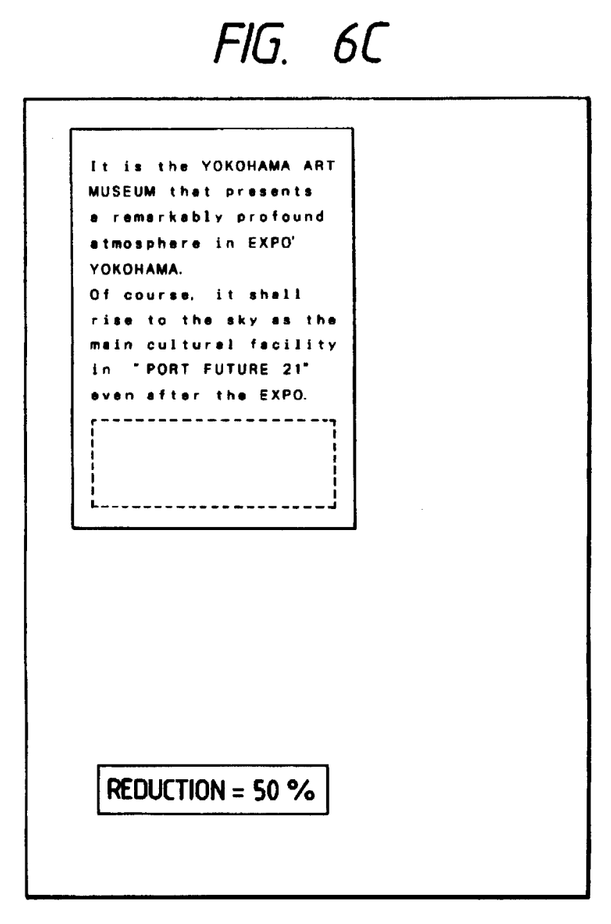

If a composite image of a text and a graphics image data (such as a graphics image read with a scanner or the like) is to be printed as shown in FIG. 6B, a reduced image thereof is printed as shown in FIG. 6A. The graphics image is reduced by a thinning process executed by CPU 21. Without a thinning process, the graphics image area may be surrounded by a broken line to indicate that the graphics image is contained therein, as shown in FIG. 6C. In the case of the image shown in FIG. 6C, the processing time of CPU 21 is shortened because there is no thinning process.

In this embodiment, the printing apparatus has been described for use with debugging operation. This apparatus may be used for other purposes, such as checking the print results of image data generated by a word processor or the like.

Figure 7:
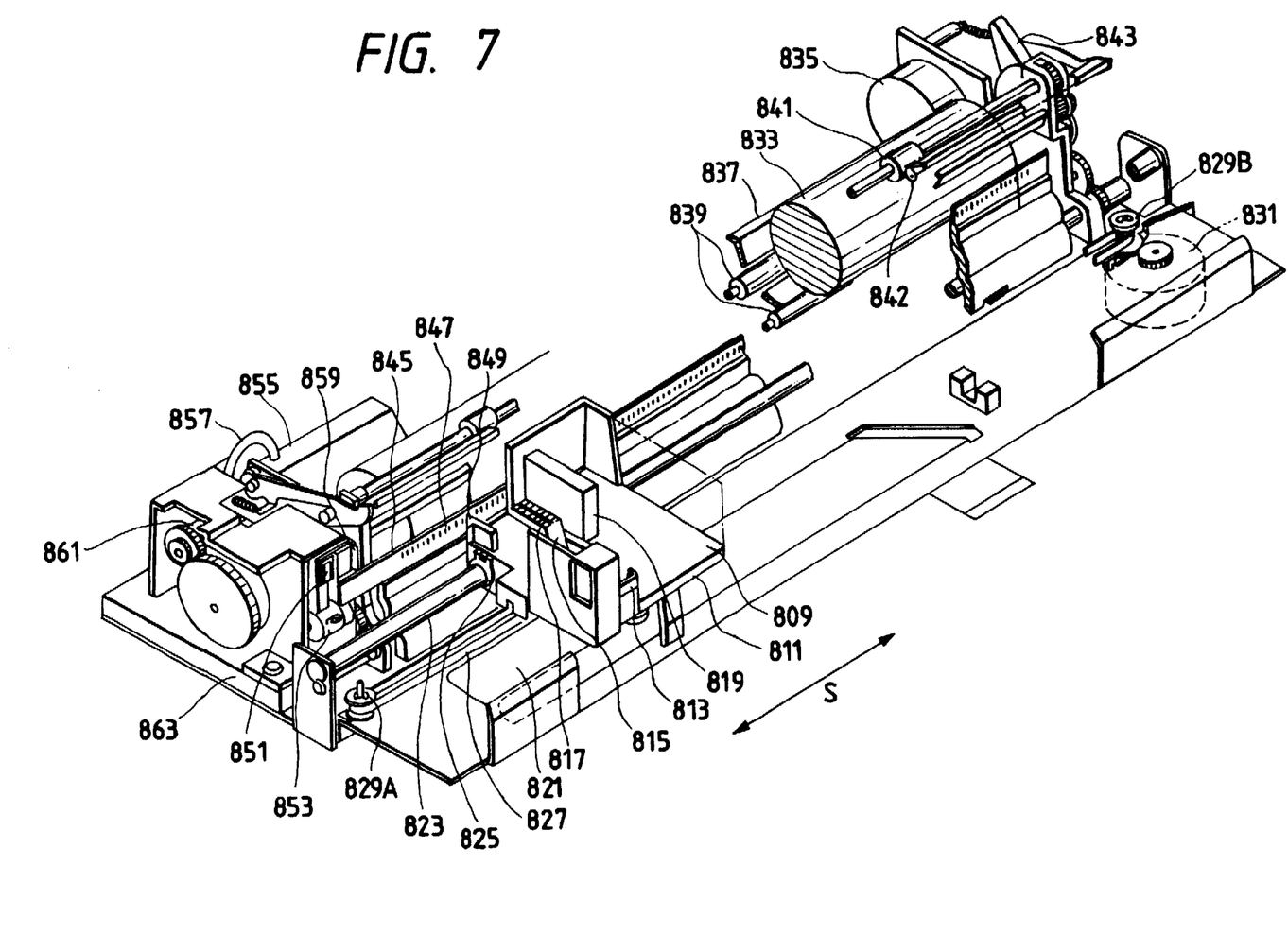
FIG. 7 shows an example of the structure of an image forming unit according to that embodiment.

FIG. 7 shows an example of the structure of the image forming unit 3 of the embodiment. This image forming unit 3 is a bubble jet printer.

In FIG. 7, a head cartridge 809 has a ink jet recording head. A carriage 811 mounts the head cartridge and scans it in the directions indicated at S. The head cartridge 809 is mounted on the carriage 811 by means of a hook 813 which is operated by a lever 815. The lever 815 is provided with a marker 817 for indicating a scale (to be described later) on a cover and reading the print position and setting position of the recording head. A support plate 819 supports an electric connection unit for the head cartridge 809. A flexible cable 821 interconnects the electric connection unit and a main controller unit.

A guide shaft 823 inserted into a bearing of the carriage 811 guides the carriage 811 in the S directions. A timing belt 817 on which the carriage 811 is fixed transmits the power for moving the carriage in the S directions. The timing belt extends between pulleys 829A and 829B disposed at opposite sides of the apparatus. The driving force of the carriage motor 831 is transmitted via a transmission mechanism such as gears to the pulley 829B.

A platen roller 833 adjusts the recording surface of a recording medium such as a paper (hereinafter called a recording paper) and transports the recording paper. The platen roller 833 is driven by a transport motor 835. A paper pan 837 guides a recording medium from a paper supply tray to a recording station. Feed rollers 841 mounted at a recording paper feed path push a recording medium against the platen roller 833 to feed the recording paper. A paper discharge roller 841 is disposed downstream of the recording station in the recording medium feed direction, and discharges a recording medium to a paper discharge port (not shown). A spur 842 pushes the paper discharge roller 841 to apply a recording medium transport force to the paper discharge roller 841. A release lever 843 releases the forces applied by the feed rollers 839, a pushing plate 845, and the spur 842 when a recording medium is set or in other cases.

The pushing plate 845 prevents a recording medium from being lifted up near at the recording station so as to ensure tight contact of the recording medium with the platen roller 833. In this embodiment, the ink jet recording head is used as the recording head for ink-jet recording print data. Therefore, the distance between the ink jet outlet surface of the recording head and the surface of a recording medium is relatively small, and the distance should be strictly managed in order to avoid a contact therebetween. The pushing plate 845 is effectively used for this purpose. A scale 847 is formed on the pushing plate 845. A marker 849 is mounted on the carriage 811 for pointing the scale 847 so that the print position and setting position of the recording head can be read.

A cap 851 made of elastic material such as rubber is provided at the home position, facing the ink jet outlet forming surface. The cap 851 is supported such that it can contact with or detach from the recording head. The cap 851 is used for protecting the recording head while it is not used for recording, or is used for the jet recovery process of the recording head. The jet recovery process includes a process (preliminary process) of removing the causes of ink jet failure such as air voids, dust, ink not suitable for recording due to increased viscosity, by driving energy generating elements provided inside of the ink jet outlets and ejecting ink from all ink jet outlets. The jet recovery process also includes a process of removing the causes of ink jet failure by forcibly ejecting ink from ink jet outlets.

A pump 853 is used for generating an attraction force for forcibly ejecting ink, or is used for sucking ink received by the cap 851 during the forcible jet recovery process or during the preliminary jet recovery process. A waste ink tank 855 stores waste ink sucked out by the attraction force of the pump 853. A tube 857 is coupled between the pump 853 and the waste ink tank 855.

A blade 859 is used for wiping the jet outlet forming surface of the recording head. The blade 859 is movably supported between a wiping position taken during the head motion by projecting the blade to the recording head side, and a retracted position where the blade does not engage the jet outlet forming surface. Reference numeral 861 represents a recovery motor. A cam unit 863 receives power from the recovery motor 861 for driving the pump 853 and for moving the cap 851 and blade 859. The bubble jet type is used in this embodiment. Obviously, the invention is applicable to an aero-jet type using an air stream in ejecting ink.

As the image forming unit 3, a laser beam printer may also be used.

Figure 8:
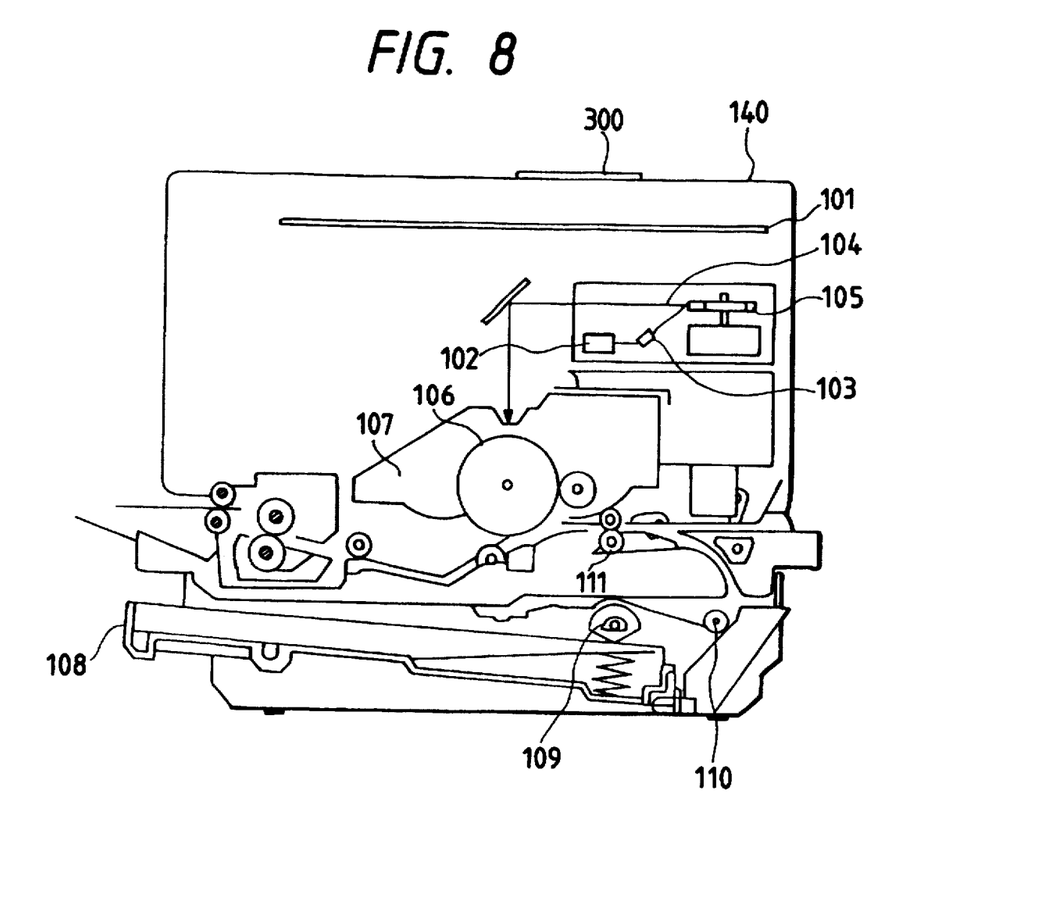
FIG. 8 shows an example of the structure of an image forming unit according to another embodiment.

FIG. 8 is a cross-sectional view showing the internal structure of a laser beam printer (hereinafter abbreviated as LBP). With this LBP, an inputted character pattern data can be printed on a recording paper.

In FIG. 8, the LBP 140 forms an image on a recording medium or recording sheet in accordance with a supplied character pattern data or the like. An operation panel has control switches. LED displays, and the like. A printer control unit 101 controls the LBP 140 and analyzes character pattern data supplied from a processor unit 12. The printer control unit 101 mainly operates to convert character pattern information into a video signal and output it to a laser driver 102.

The laser driver 102 is a circuit for driving a semiconductor laser 103 by turning on and off a laser beam emanated from the semiconductor laser 103, in accordance with the inputted video signal. The laser beam 104 is swung right and left by a rotary polygonal mirror 105 to scan the electrostatic drum 106, so that an electrostatic latent image of the character pattern is formed on the electrostatic drum 106. This latent image is developed by a developing unit 107 disposed near at the periphery of the electrostatic drum 106, and thereafter it is transferred to a recording paper. As the recording paper, a cut sheet is used which is housed within a paper cassette 108 mounted on the LBP 140. The cut sheet is fed into the LBP and supplied to the electrostatic drum 106 via paper feed rollers 109 and transport rollers 110 and 111.

As described so far, according to the present invention, an output image can be obtained in a short time to deal with a request of a quick check of the print results, while suppressing the consumption amount of recording medium used in image recording.

I claim:

1. A data output apparatus which receives code data from an external apparatus, generates image data from the received code data, and outputs the generated image data, said data output apparatus comprising:

input buffer means for storing the received code data;

intermediate buffer means for storing intermediate data generated from the code data stored in said input buffer means;

output buffer means for storing image data generated from the intermediate data stored in said intermediate buffer means;

determination means for determining in which one of a plurality of output modes including first and second modes said data output apparatus is set; and control means for, when said determination means determines that said data output apparatus is set in the first mode, controlling said intermediate buffer means and said output buffer means such that image data generated at a first size designated by the external apparatus from the intermediate data stored in said intermediate buffer means is stored in said output buffer means and the generated image data is sent from said output buffer means to an output section of said data output apparatus and thereafter the stored intermediate data is deleted from said intermediate buffer means, and for, when said determination means determines that said data output apparatus is set in the second mode, controlling said intermediate buffer means and said output buffer means such that image data generated at a second size smaller than the first size, from the intermediate data stored in said intermediate buffer means is stored in said output buffer means and the generated image data is sent from said output buffer means to the output section and thereafter the stored intermediate data is retained in said intermediate buffer means.

2. A data output apparatus according to claim 1, wherein the code data comprises a character code.

3. A data output apparatus according to claim 1, wherein the intermediate data comprises one page of data.

4. A data output apparatus according to claim 1, wherein the image data comprises one page of data.

5. A data output apparatus according to claim 1, wherein the output section comprises a printer engine.

6. A data output apparatus according to claim 1, wherein said control means controls said intermediate buffer means and said output buffer means such that image data generated at the first size from the intermediate data retained in said intermediate buffer means is stored in said output buffer means and the generated image data is sent from said output buffer means to the output section, without receiving the code data again from the external apparatus, if an indication is received, during control in the second mode, that allows image data to be sent from said output means to the output section at the first size.

7. A data output apparatus according to claim 6, wherein said control means controls said intermediate buffer means to delete the retained intermediate data after the generated image data has been sent from said output buffer means to the output section.

8. A method of controlling a data output apparatus which comprises an input buffer for storing code data received from an external apparatus, an intermediate buffer for storing intermediate data generated from the code data stored in the input buffer, and an output buffer for storing image data generated from the intermediate data stored in the intermediate buffer, and which outputs the image data from the output buffer, said method comprising the steps of:

determining which one of first and second modes is set; and controlling the intermediate buffer and the output buffer such that image data generated at a first size designated by the external apparatus from the intermediate data stored in the intermediate buffer is stored in the output buffer and the generated image data is sent from the output buffer to an output section of the data output apparatus and thereafter the stored intermediate data is deleted from the intermediate buffer in the event that it is determined in said determining step that the first mode is set; and controlling the intermediate buffer and the output buffer such that image data generated at a second size, smaller than the first size, from the intermediate data stored in said intermediate buffer means is stored in the output buffer and the generated image data is sent from the output buffer to the output section and thereafter the stored intermediate data is retained in the intermediate buffer in the event that it is determined in said determining step that the second mode is set.

9. A method according to claim 8, wherein the code data comprises a character code.

10. A method according to claim 8, wherein the intermediate data comprises one page of data.

11. A method according to claim 8, wherein the image data comprises one page of data.

12. A method according to claim 8, wherein the output section comprises a printer engine.

13. A method according to claim 8, wherein the intermediate buffer and the output buffer are controlled such that image data generated at the first size from the intermediate data retained in the intermediate buffer is stored in the output buffer and the generated image data is sent from the output buffer to the output section, without receiving the code data again from the external apparatus, if an indication is received, during control in the second mode, that allows image data to be sent from the output to the output section at the first size.

14. A method according to claim 13, the intermediate buffer is controlled to delete the retained intermediate data after the generated image data has been sent from the output buffer to the output section.

* * * * *

UNITED STATES PATENT AND TRADEMARK OFFICE
CERTIFICATE OF CORRECTION

PATENT NO. : 5,777,617

DATED : July 7, 1998

INVENTOR(S) : SHINYA KISHIMOTO

It is certified that error appears in the above-identified patent and that said Letters Patent is hereby corrected as shown below:

<u>ON COVER PAGE AT [56], Attorney, Agent, or Firm</u>

"Fitzpatrick, Cella Harper & Scinto" should read --Fitzpatrick, Cella, Harper & Scinto--.

In the drawings,

<u>SHEET 2</u>

Figure 2A, "prefound" should read --profound--.

<u>COLUMN 1</u>

Line 25, "minutes" (second occurrence) should read --minutes--,.

Line 56, "consumed" should be deleted.

<u>COLUMN 2</u>

Line 41, "prefer" should read --preferred--.

UNITED STATES PATENT AND TRADEMARK OFFICE
CERTIFICATE OF CORRECTION

PATENT NO. : 5,777,617
DATED : July 7, 1998
INVENTOR(S) : SHINYA KISHIMOTO

It is certified that error appears in the above-identified patent and that said Letters Patent is hereby corrected as shown below:

COLUMN 3

Line 30, "synch" should read --sync--.
    Line 49, "an" should read --a--.

COLUMN 8

Line 12, "size" should read --size,--.

COLUMN 10

Line 7, "output" (first occurrence) should read --output buffer--.

Signed and Sealed this

Twenty-ninth Day of June, 1999

Attest:

Attesting Officer

Q. TODD DICKINSON

Acting Commissioner of Patents and Trademarks